United States Patent [19]
Smitt

[11] Patent Number: 5,988,504
[45] Date of Patent: Nov. 23, 1999

[54] OPTICAL SCANNER USING WEIGHTED ADAPTIVE THRESHOLD

[75] Inventor: Asbjorn Smitt, Alsgarde, Denmark

[73] Assignee: Contex A/S, Allerod, Denmark

[21] Appl. No.: 08/893,107

[22] Filed: Jul. 15, 1997

[51] Int. Cl.$^6$ .................................................. G06K 9/58

[52] U.S. Cl. ............................ 235/462.019; 235/462.25; 358/456

[58] Field of Search .................. 235/462.01, 462.16, 235/462.19, 462.25; 382/172; 358/455, 456, 474

[56] References Cited

U.S. PATENT DOCUMENTS

| | | | |
|---|---|---|---|
| 4,345,314 | 8/1982 | Melamud et al. | 364/515 |
| 5,377,020 | 12/1994 | Smitt | 358/456 |

*Primary Examiner*—Anita Pellman Gross
*Assistant Examiner*—Drew A. Dunn
*Attorney, Agent, or Firm*—Brinks Hofer Gilson & Lione

[57] ABSTRACT

An optical scanner having a weighted adaptive threshold value determination for generating a one-bit representation of a scanned original. The optical scanner comprises an optical detecting unit which provides a discrete signal representing pixels in a scanned region and first device for generating a first weighted discrete signal which is a weighted version of the discrete signal representing pixels in a scanned region. The optical scanner further comprises second device for providing a filtered signal which is a filtered version of the weighted discrete signal and third device for generating a second weighted signal, being a weighted version of the filtered signal. A comparison device produces a binary output as a function of the discrete signal representing pixels in a scanned region and the second weighted signal.

20 Claims, 13 Drawing Sheets

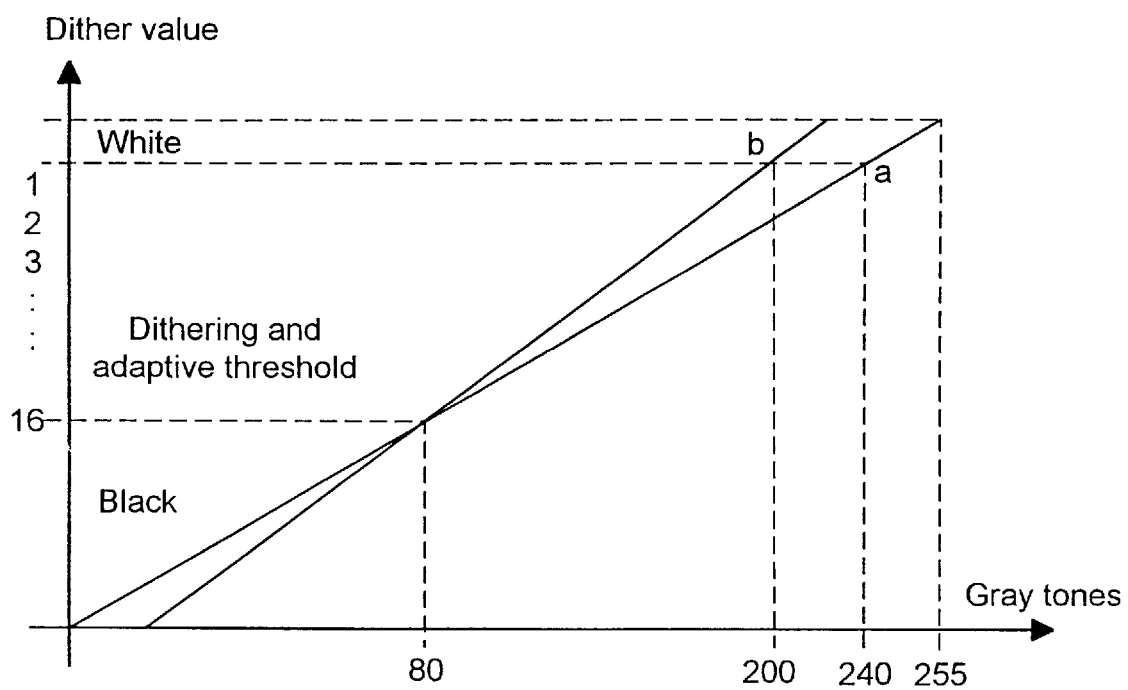

OPTICAL SCANNER USING WEIGHTED ADAPTIVE THRESHOLD

FIELD OF THE INVENTION

The invention relates to the field of optical scanning systems, especially conversion of non-ideal graytone documents into ideal one-bit images.

BACKGROUND OF THE INVENTION

In general, when optical scanners scan, they generate an electronic signal representing grey tone values for points along lines across the scanned document. The grey tone values are typically represented as a digital multi-bit signal.

On documents, like e.g. technical drawings, to be scanned by an optical scanning system, it is possible to define three terms: foreground, background, and information content. The background represents the color or tone of the document, e.g. white or colored paper. The information content is typically in form of lines or characters, whereas the foreground represents the appearance of the information content in black or dark grey tones.

On a document both the background and the foreground may fluctuate across the document. This may be due to the fact that the original is dirty or multi-colored. Further characters and lines are often smeared or smudged, and are sometimes written with either very light strokes that are difficult to detect, or very heavy strokes that tend to broaden and run together when imaged. When originals with these real-life characteristics are scanned and converted into a one-bit image, a simple global threshold value is not appropriate.

Many types of histogram methods have been proposed for thresholding, but they have the drawback that either they must set a global threshold value for the document, or they must be based on sections of the document in order to be computationally feasible. These methods are characterized by trying to estimate the histogram minimal position that best discriminates the information content from the background. If the threshold value determination is based on histograms for sections of the document, it is difficult to select a global contrast or 'dark/light' setting.

In order to obtain a better suppression of unwanted background patterns, that is e.g. the dirt and multicolor, and to overcome problems of an altering foreground, adaptive or dynamic threshold value determination is used. U.S. Pat. No. 5,377,020 discloses a method of providing local threshold values for zones on a original based on statistically determining the local threshold values in response to the frequency distribution of grey level values belonging to points from line segments in a zone.

These prior art adaptive threshold value determination methods, however, do not overcome a particular problem: for a typical drawing, the background constitutes the major part of the entire document area. In such a case the pixel values from the scanned document are a bad statistical material for adaptive threshold value determination because the goal is to discriminate the information content from the unwanted background patterns.

U.S. Pat. No. 4,345,314 discloses a method which, to some extent, overcomes this problem by incorporating an equalizing function in front of a 2D spatial moving average filter which provides a threshold value for a one-bit comparison. Due to the fact that the threshold comparison operates on an equalized (and filtered) set of pixel values which do not preserve the mean value in the scanned original, the equalizing function has to be selected quite close to a linear function. For a typical real-life document this method is limited because it does not provide a sufficient threshold value accuracy.

SUMMARY OF THE INVENTION

According to the present invention it is possible to overcome this 'near linear' limitation on the equalizing function if a second transformation, which preserves the mean value in the scanned original, is applied before the 2D spatial moving average filter.

The adaptive weighted threshold determination comprises first means for generating a first weighted discrete signal, which is a weighted version of said discrete signal representing pixels in a scanned region, second means for providing a filtered signal, which is a filtered version of said weighted discrete signal, and third means for generating a second weighted signal, which is a weighted version of said filtered signal. The binary output is a result of a comparison of said discrete signal representing pixels in a scanned region and said second weighted signal.

In a preferred embodiment the discrete signal is an 8-bit multi-bit signal. The discrete signal representing pixels in a scanned region may be delayed to allow the threshold determination to be based on grey tone values from points both preceding and succeeding the points for which the adaptive threshold values are determined. It may be further preferred to perform some type of interpolation filtering of the discrete signal representing pixels to provide intermediate pixel values for a resolution enhancement.

According to the invention, it is preferred to allow the first and third means to implement a weighting function and an inverse weighting function, respectively. The weighting functions may be piecewise compounded in order to obtain a numerically well-suited solution.

According to the invention the filtering process may be based on either a zoned filtering or a 2D moving average filtering. In a preferred embodiment, the 2D moving average filtering is implemented in, along and across line sections, respectively.

Still according to the invention the optical scanner for generating a one-bit representation of a scanned original may comprise a dither circuit to provide a one-bit representation in the form of values from a dither circuit and a converter for converting the grey tone signal into a signal comprising a one-bit-representation, said conversion being responsive to the individual grey tone values, the adaptive threshold values, and the dither values from the dither circuit.

BRIEF DESCRIPTION OF THE DRAWINGS

The invention will be explained more fully below in connection with a preferred embodiment and with reference to the drawing, in which:

FIG. 11(a) shows a standard dither matrix;

FIG. 11(b) shows a corrected dither matrix;

FIG. 12 illustrates the function of the apparatus shown in FIG. 8;

DETAILED DESCRIPTION OF THE INVENTION

Figure 1:
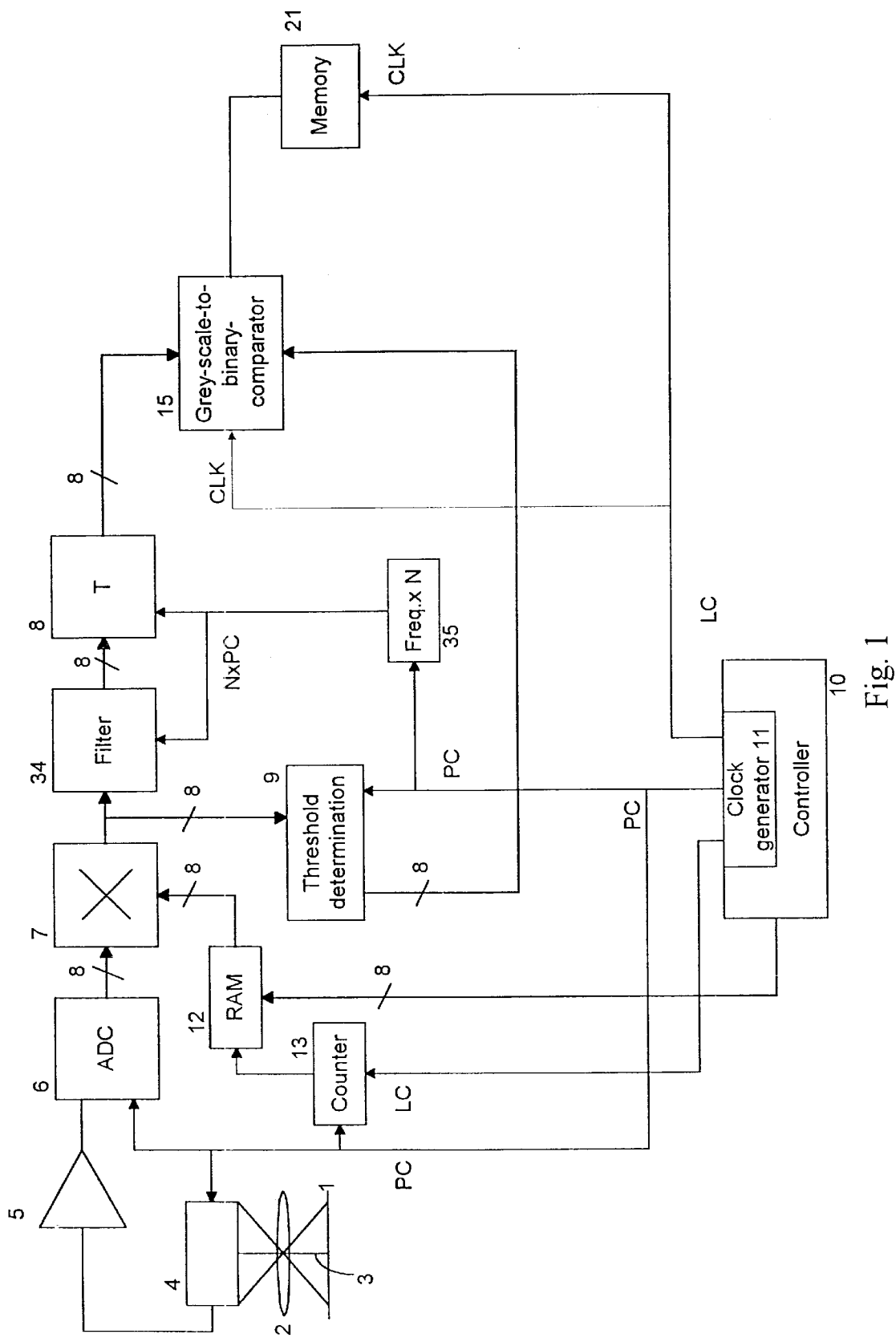
FIG. 1 shows a preferred embodiment of an apparatus for scanning a document and preparing the signal provided by the scanning for storage or reproduction, using moving area adaptive thresholding.

The preferred embodiment of the scanner according to the invention is shown in FIG. 1 and is based on successive scanning of lines on a document 1. The scanner may be of the flat bed, roller, drum, or another type. An image sensor e.g. comprised by a lens system 2, having an optical axis 3 images a line on the document 1 on a line sensing array 4, e.g. a CCD unit. When the amount of light detected by the cells in the array 4 has been read out from the array 4, the document is moved slightly for scanning the next line.

The analogue voltage from the cells of the array 4 is clocked out by using a pixel clock signal PC provided by a clock generator unit 11 associated with the controller 10 of the scanner. The sequence of analogue voltage levels is transferred from the array 4 to an amplifier 5 for amplification. The amplified analogue signal is converted into a multi-bit signal or an 8-bit signal in an analog to digital converter (ARC) 6. The conversion is controlled by the pixel clock PC.

A reference has been scanned in advance, whereby the controller unit 10 has been able to calculate the sensitivity for each of the cells in the array 4. This knowledge is used to determine a correction factor for each of the cells in the array. These correction factors are transferred from the controller 10 to a RAM memory 12. A counter 13 is reset by a line clock signal LC from the clock generator unit 11 and is increased by one each time it receives a pixel clock pulse. The counter value represents the pixel number in a line and is transferred to the RAM memory 12 for addressing the corresponding correction factor. The correction factor is transferred to a multiplier 7 in which the digitized pixel value is compensated with the corresponding correction factor.

The corrected 8-bit signal from the multiplier 7 is split in a branch, and one part is received by an adaptive threshold determining circuit 9. The adaptive threshold determining circuit 9 determines adaptive threshold values for pixels along the scanned lines, and the determined adaptive threshold values are transferred to a first comparator input of the gray-scale-to-binary-comparator 15.

The other part of the branched 8-bit signal is received by a digital interpolation filter unit 34 which, for each received 8-bit grey tone value, outputs either one 8-bit grey tone value or an increased number N of interpolated 8-bit grey tone values in dependence on an N×PC clock output from a clock multiplier unit 35. A preferred way of doing so is described in the U.S. Pat. No. 5,502,578 assigned to the assignee in this case. This patent is hereby incorporated by reference.

In case of N having the value one, digital interpolation filter unit 34 is transparent and passes on the received 8-bit signal. That is: the filter 34 can be omitted.

The 8-bit grey tone values from the digital filter unit 34 are received by a delay unit 8, e.g. a FIFO register. The duration of the delay depends on the lag of the calculated threshold values and is discussed in the U.S. Pat. No. 4,345,314. The register is employed to provide a look-ahead function so that the actual threshold decision is based not only on pixels scanned previously to the actual pixel for which the decision is to be made, but in addition pixels scanned beyond the actual pixel.

The N×PC clock shifts the digital data through the FIFO register 8.

The digital 8-bit grey tone values are transferred from the delay to a second comparator input of the grey-scale-to-binary-comparator 15. In comparator 15 the 8-bit grey tone values present at the first and second comparator input; that is the threshold values and the grey tone values, are compared. If the grey tone value exceeds the threshold value, the output of the comparator will be the binary value "1" (white), otherwise "0" (black). This value may be printed on e.g. a laser printer, viewed on a display device, or stored in a file. In the implementation shown in FIG. 1 the values are stored in a memory 21.

The comparator 15 is controlled by the resolution clock CLK from the clock generator unit 11. The CLK clock pulses are a selected subset of the N×PC clock pulses, and the selection is made by the clock generator unit 11 and controller 10 so as to obtain a variable preselected output resolution from the grey-scale-to-binary-comparator 15. This is discussed in the U.S. Pat. No. 5,502,578.

Figure 2:
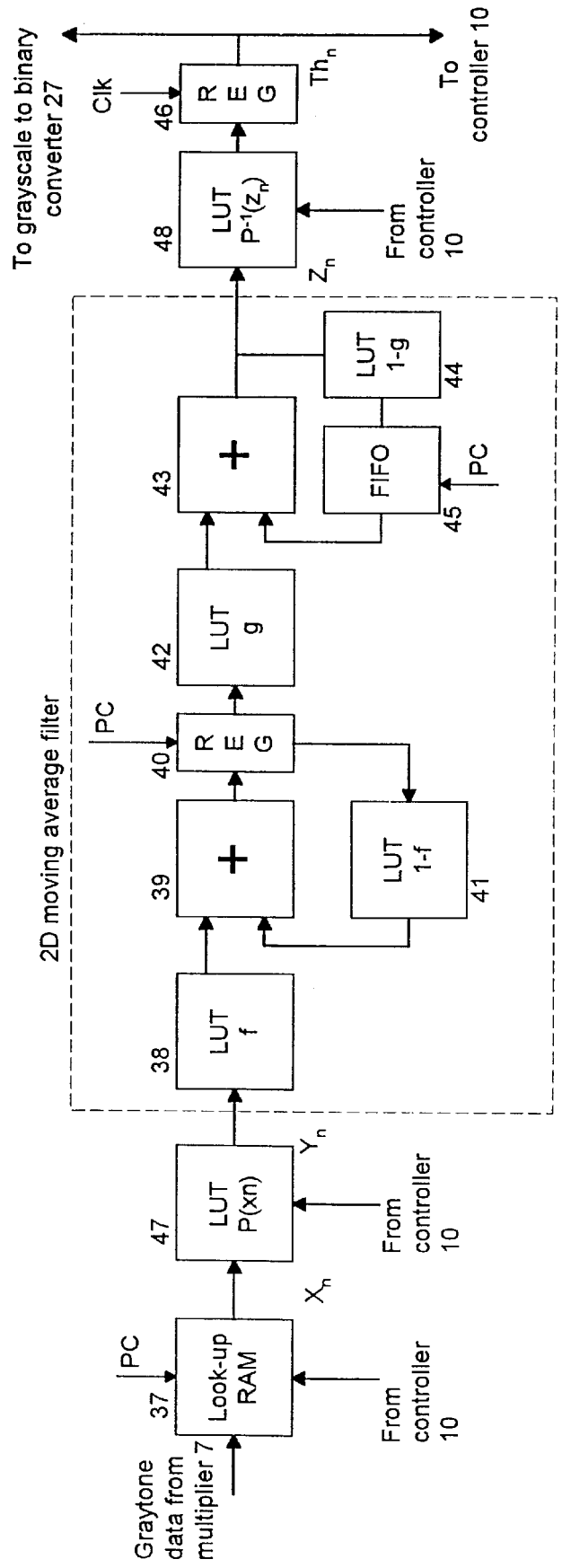
FIG. 2 shows a preferred embodiment of a low-pass digital filter threshold circuit according to the invention.

A preferred embodiment of the adaptive threshold circuit according to the invention is shown in FIG. 2. The adaptive threshold circuit is based on a two dimensional digital low-pass filter providing a moving area average of pixel grey tone values along scan lines. The adaptive threshold circuit in FIG. 2 may replace the corresponding part shown in FIG. 1: the adaptive threshold determination circuit 9.

The multi-bit signal comprising 8-bit values (values 0–255) from the multiplier 7 is passed to a look-up table (LUT) 37, in which a previously loaded pre-emphasis function is stored. The addressed 8-bit look-up value is then passed to the LUT 47, in which a previously loaded first weighting function is stored. This addressed 8-bit lookup value is passed via the multiplication-by-f LUT 38 ($0<f<1$) to an adder 39. A first feedback signal is added to the multiplied signal by the adder 39. The sum from the adder 39 is stored in a register 40 clocked by the pixel clock PC, the 8-bit output from register 40 is branched, and, via one branch after multiplication-by-(1-f) in LUT 41, passed on as said first feedback signal to the adder 39, and, via the other branch after multiplication-by-g in LUT 42 ($0<g<1$), transferred as input to an adder 43. A second feedback signal is added to the signal from the divider 42 by the adder 43. The 8-bit sum from the adder 43 is branched and, via one branch after multiplication-by-(1-g) in LUT 44, stored in the FIFO 45 clocked by the pixel clock PC, and, after a delay of one scan line in FIFO 45, passed on as said second feedback signal to the adder 43. The other branch passes the 8-bit sum from the adder 43 to the LUT 48, in which a previously loaded second weighting function is stored.

The addressed 8-bit look-up value is then stored in a register 46 in dependence on the resolution clock CLK; the 8-bit output from register 46, constituting a two-dimensional running area average of the pixel grey tone values scanned, is branched and passed on to the grey scale-to-binary converter 15 and the controller 10 as the continuously updated adaptive threshold value.

It is well known to one skilled in the art to extend the area included in the two-dimensional average by changing the reduction factors in the digital low-pass filter defining LUTs 38,41,42, 44 e.g. by changing a multiplication-by-½ in LUT 38 and LUT 41 to one-eighth-part in LUT 38 and seven-eighth-part in LUT 41.

In order to compensate for the different characteristics in various document types e.g. line drawings, blueprints, or maps, the functions stored in look-up tables 37, 47 and 48 may be changed. The controller 10 is connected to the look-up tables for loading transfer functions. The actual transfer functions loaded are determined by the controller 10 based on the operator settings.

Figure 3:
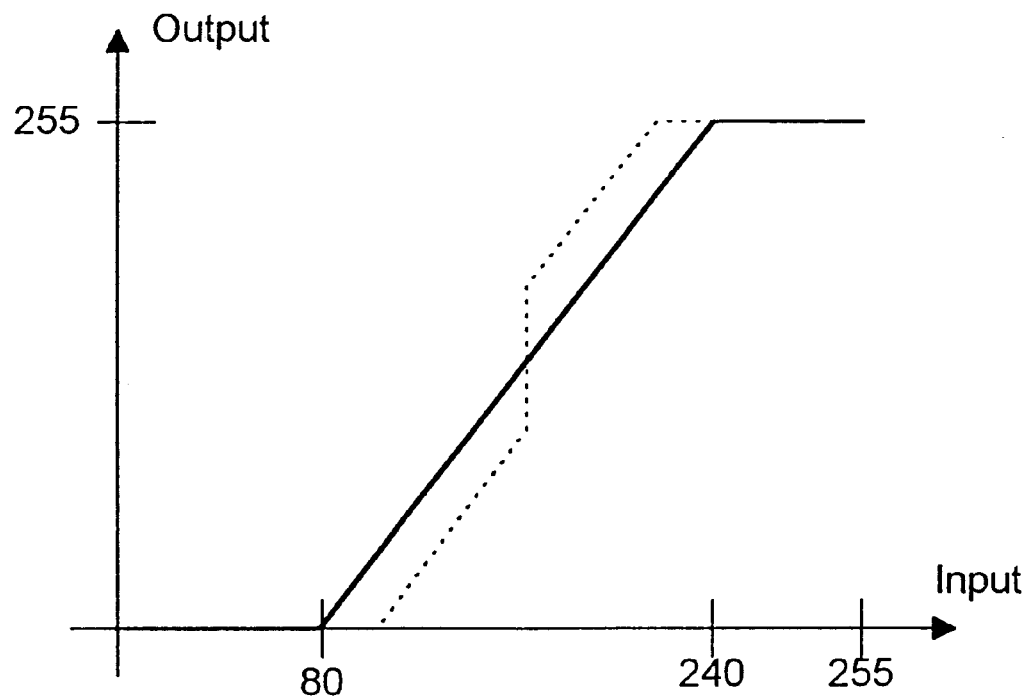
FIG. 3 shows an example of a transfer function stored in a look-up table according to a preferred embodiment of the invention.

FIG. 3 shows an example of a pre-emphasis function stored in look-up table 37 according to a preferred embodiment of the invention. The transfer function eliminates variations in the input pixel value range below 80 and above 240, thereby giving input pixel values between 80 and 240 a full-scale span, i.e. values 0–255. The characteristics of the function may be based on contrast or dark-light operator settings. The dotted function is an alternative transfer function, a so-called bias function. A bias function is used to offset the threshold decision level so that the threshold decision is not disturbed by noise fluctuations in uniform areas. This is further discussed in "Image Thresholding for Optical Character Recognition and Other Applications requiring Character Image Extraction" from IBM J. RES. DEVELOP, vol. 27, no. 4, 1983, by J. M. White and G. D. Rohrer. Alternatively the pre-emphasis curve and the first weighting function may be mathematically combined and stored in LUT 47, thereby omitting LUT 37. Similarly a post-emphasis function and the second weighting function may be mathematically combined and stored in LUT 48.

Adaptive thresholding based on some type of low-pass filtering of pixels representing a scanned original is well suited for most scanning applications, however the performance of the traditional thresholding approach may be refined if a number of important facts are realized. On the vast majority of originals to be scanned the background is represented by pixel values which belong to one end of a grey tone spectrum, and the foreground or information content is represented by pixel values which belong to the other end of the spectrum. That is what is makes it possible to visually extract the information content on the original. Further it is realized that most of the area of the original is background, and that grey tone variations in the foreground or information end of the grey tone spectrum seem to be more important than variations in the background end of the grey tone spectrum, when considering reproduction of an original with the aim of information extraction. One way of obtaining the mentioned refinement is to apply some type of weighting of the pixel values, by means of a weighting function P before the pixel values are filtered so that the pixel values representing foreground/information content, provided to the filter by this weighting process, are enhanced relative to the pixel values representing background. The output of the following filter process will reflect this weighting process in two ways: the important grey tone variations in the foreground or information end of the grey tone spectrum will have a larger amplitude, which is desired, but unfortunately—in the general case—the mean value of the scanned pixel values will be biased. The point is that the mean value is very important for this adaptive low-pass thresholding approach. Therefore, and according to the invention, an inverse weighting function is applied after the filtering process. The inverse weighting function is selected such that the benefit/refinement obtained by applying a weighting function before the filtering process is not disturbed and such that the mean value of the scanned pixel values, applied to the weighting function, is preserved or almost preserved in the filtered and weighted pixel values.

Figure 4:
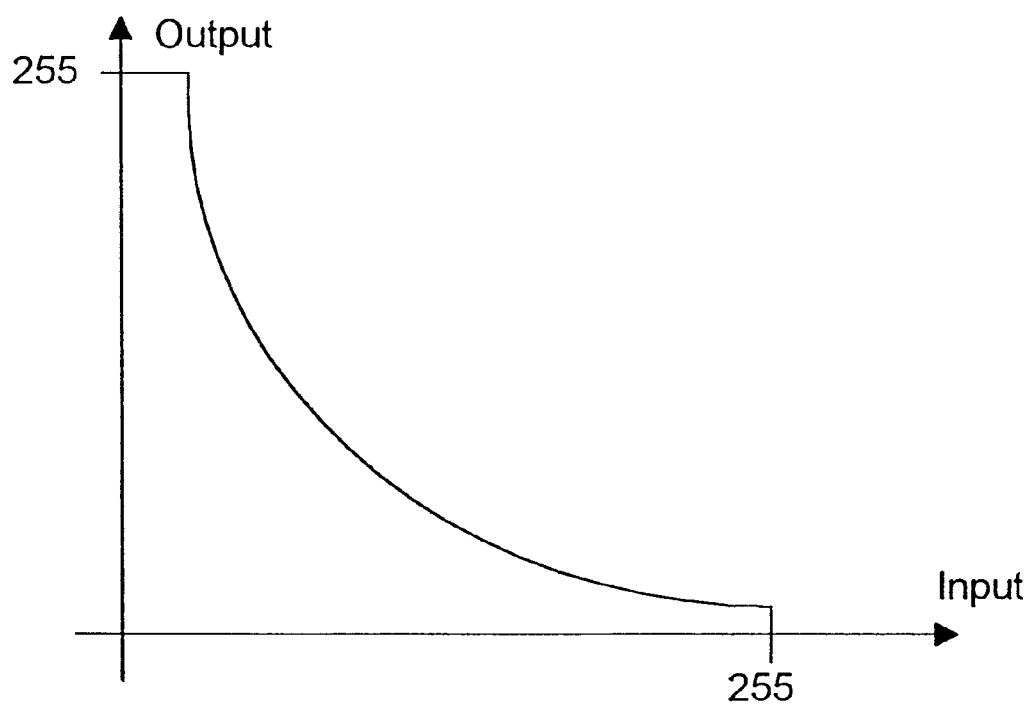
FIG. 4 shows an example of a weighting function stored in a look-up table according to a preferred embodiment of the invention.

FIG. 4 shows an example of a weighting function stored in look-up table 47 according to a preferred embodiment of the invention. The weighting function $P(x_n)$ is a function of pixel values x with index n. The function enhances small pixel values relative to large pixel values, such that if large pixel values are associated with white tones and small pixel values are associated with dark tones, the weighting function will enhance a grey tone range in the dark tones relative to a grey tone range in the white tones. This type of monotonic function is often sufficient and preferred because it provides a very flexible solution in combination with the transfer function. However, in situations where the information content to be retrieved is associated with intermediate tones on an original having black as well as white patterns, another function may be preferred. Such a function may be non-monotonic with a maximum located at the intermediate pixel values to be retrieved.

Figure 5:
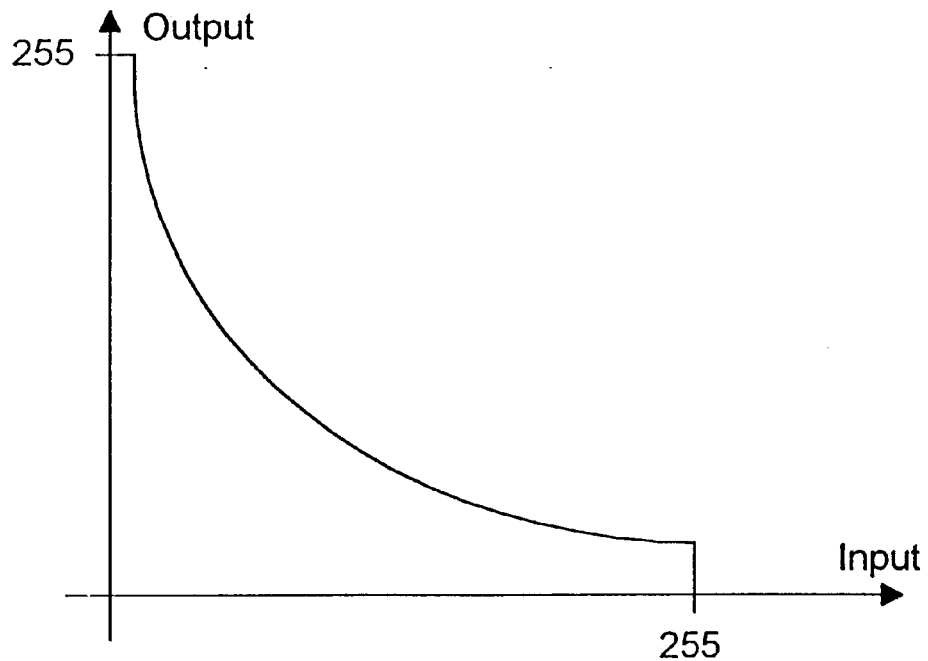
FIG. 5 shows an example of an inverse weighting function stored in a look-up table according to a preferred embodiment of the invention.

FIG. 5 shows an example of an inverse weighting function stored in look-up table 48 according to a preferred embodiment of the invention. The inverse weighting function $p^{-1}(Z_n)$ is a function of the pixel values zn provided by a 2D moving average filter. The purpose of this function is to provide a transformation which brings the weighted (and filtered) pixel values into a domain in which the threshold values can be compared with the pixel values from the original. In a preferred selection of the inverse weighting function, the overall shape of the histogram for the original is almost re-established because the effect of the filtering process is being not considered. A further preferred selection of the inverse weighting function implies that the mean value of the non-weighted pixel values is re-established. This is fulfilled if the inverse weighting function is the mathematical inverse to the weighting function.

The weighting functions shown in FIGS. 4 and 5 are smooth functions. However, it may be feasible to create a piece-wise compounded weighting and inverse weighting function if special criteria have to be fulfilled. One criterion could be due to a limited numerical representation, e.g. 8-bits.

Figure 6:
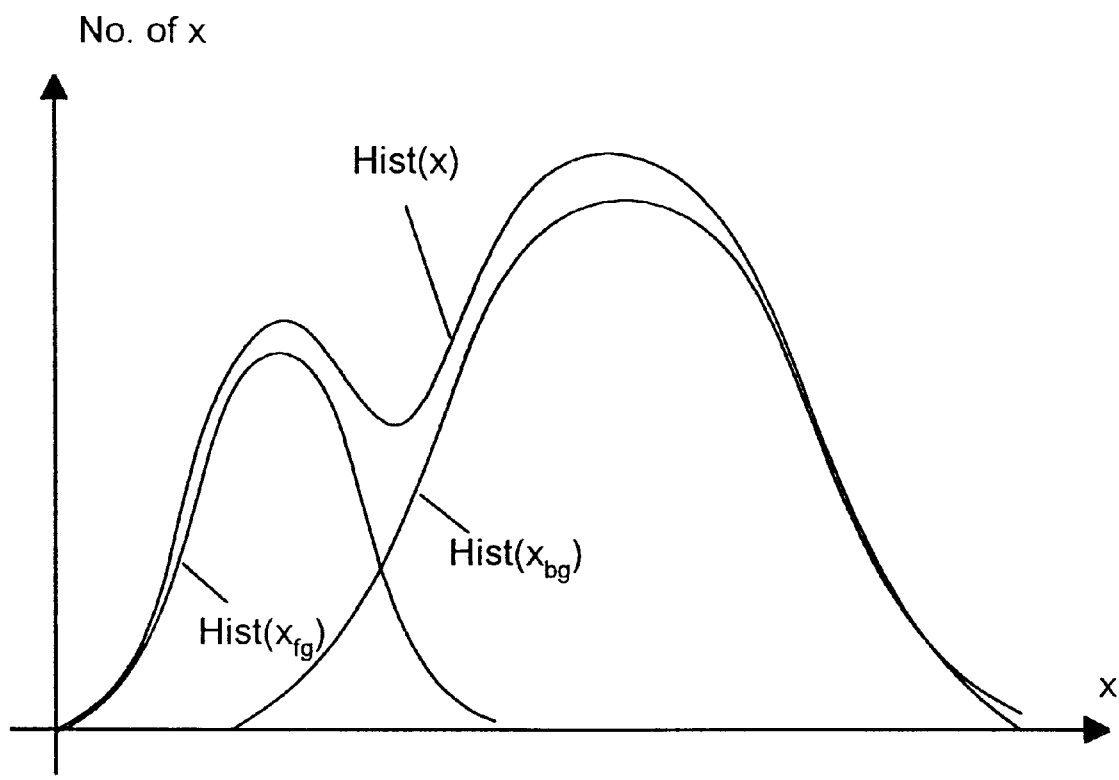
FIG. 6 shows a histogram Hist (x) for an original with pixel values x, where a major part of the area of the original is background and a minor part of the area is foreground/information, the histogram for the separated foreground and background being labeled Hist ($x_{bg}$) and Hist ($x_{fg}$)

FIG. 6 shows a histogram Hist (x) for an original with pixel values x, where a major part of the area of the original is background and a minor part of the area is foreground/information, the histogram for the separated foreground and background being labeled Hist ($x_{bg}$) and Hist ($x_{fg}$). This separation is for illustration purposes only and shows that the number of pixels belonging to the foreground is less than the number of pixels belonging to the background, and that the variance of the foreground, $V\{x_{fg}\}$, is less than the variance of the background, $V\{x_{bg}\}$. If the pixel values, of the histogram Hist (x) are filtered with a moving average filter in order to calculate a local mean-value-discriminator for separation of foreground and background, the foreground—being the interesting part—will only have a limited effect on the filter response. This is due to the nature of a linear low-pass filter.

Figure 7:
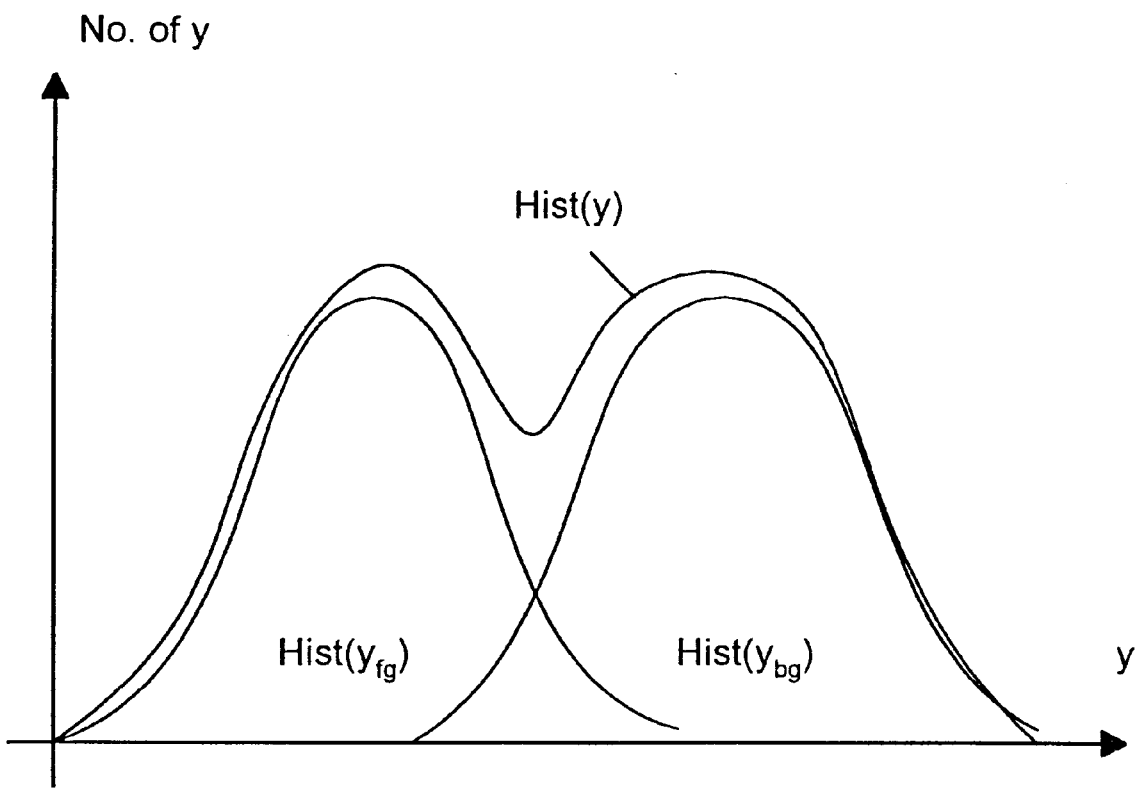
FIG. 7 shows a histogram Hist (y) for an original with weighted pixel values y, the histogram for the separated and weighted foreground and background being labeled Hist ($x_{bg}$) and Hist ($x_{fg}$)

FIG. 7 shows a histogram Hist (y) for an original (being the same as the one mentioned above) with weighted pixel values y, the histogram for the separated and weighted foreground and background being labeled Hist ($y_{bg}$) and Hist ($y_{fg}$). In this case the variance of the foreground is enhanced relative to the background. If these pixel values belonging to Hist (y) are filtered with a moving average filter, the filter response will be more responsive to the foreground. However, this filter response is not feasible for thresholding because the mean value of the weighted and non-weighted pixel values in general will be different. In the prior art, this problem has been overcome by applying an additive constant value to the filtered pixel values so as to re-establish the mean value of the original pixels, and to restrict the weighting function such that the mean value is distorted as little as possible; that is, a function being close to a linear function and thereby limiting the power of the weighting of the pixels. In order to be computationally feasible the additive value had to be a constant or operator selected value, based on a visual inspection of the scanned and reproduced document.

According to this invention it is realized that the 2D moving area average filter preserves the mean value and therefore makes an inverse weighting function a good choice for re-establishing the mean value of the pixels of the original.

The description of the signal processing implemented by the circuit shown in FIG. 2 can be rewritten in order to reflect the mathematical computations:

The function implemented by the register 40, the look-up tables 38, 41, and the adder 39 is a moving average along scan lines, z'(n).

$$z'(n) = f \cdot y(n) + (1-f) \cdot z'(n-1)$$

which may be expanded:

$$z'(n) = \sum_{i=o}^{n} f \cdot (1-f)^i \cdot y(n-i)$$

where n is the actual pixel number, f is a constant, and y is the input to the moving average along scan lines.

The function implemented by the FIFO 45, the look-up tables 42, 44, and the adder 43 is a moving average across scan lines, z(n).

$$z(n) = g \cdot z'(n) + (1-g) \cdot z(n-1)$$

which may be expanded:

$$z'(n) = \sum_{t=o}^{\text{int}(\frac{n}{l})} g \cdot (1-g)^t \cdot z'(n-l \cdot t)$$

where n is the actual pixel number, g is a constant, and z' is the input to the moving average across scan lines. l is the number of pixels within a line. Combining the two expanded equations for moving average along and across scan lines yields the moving area average, z' (n):

$$z'(n) = \sum_{t=o}^{\text{int}(\frac{n}{l})} g \cdot (1-g)^t \cdot \sum_{i=o}^{n-l \cdot t} f \cdot (1-f)^i \cdot P(n-l \cdot t - i)$$

where P(n) is a function of the n'th pixel value xn. P(n) may be implemented by the look-up table 47.

This equation is extended with the function $p^{-1}$ according to the invention.

$$Th(n) = P^{-1}(z'(n)) = P^{-1}\left(\sum_{t=o}^{\text{int}(\frac{n}{l})} g \cdot (1-g)^t \cdot \sum_{i=o}^{n-l \cdot t} f \cdot (1-f)^i \cdot P(n-l \cdot t - i)\right)$$

$p^{-1}(\ )$ is the inverse weighting function implemented by means of look-up table 48 and may be the inverse function to the weighting function $P(\ )$. The function $P(\ )$ may e.g. be:

$$\frac{1}{x_n}; \quad \frac{c_1}{x_n - c_2}; \quad \frac{1}{x_n^2}; \quad \frac{c_1}{x_n - c_2}; \quad \exp(x_n); \quad c_1(\exp(x_n) - c_2)$$

or any other feasible continuous or piecewise linear function, where c1 and c2 are constants.

Making the reasonable assumption that the moving area filtering process does not effect the approximated mean value and variance of the separated foreground and background of a scanned original (see FIGS. 4 and 5), it becomes clear that an additional mean value introduced by the weighting function P must be removed with the inverse function $p^{-1}$ in order to preserve the shape of the overall histogram. This provides a threshold determination where the variance ratio between the foreground and background can be scaled freely before the filtering process.

A moving area average process will have a 'filter window' within which pixels in the tail of that window will constitute a limited response on the filter output relative to pixels located in the beginning of the window. The window originates at the position of the actual pixel to be filtered. The size of the window may be controlled by selecting a limited number of summations at each pixel iteration or effectuated by the resolution of the signal processing, e.g. 8 bit.

Another preferred embodiment of a scanner according to the invention is based on dividing the scanned original into a number of zones and calculating threshold values for pixels in an actual zone.

Figure 8:
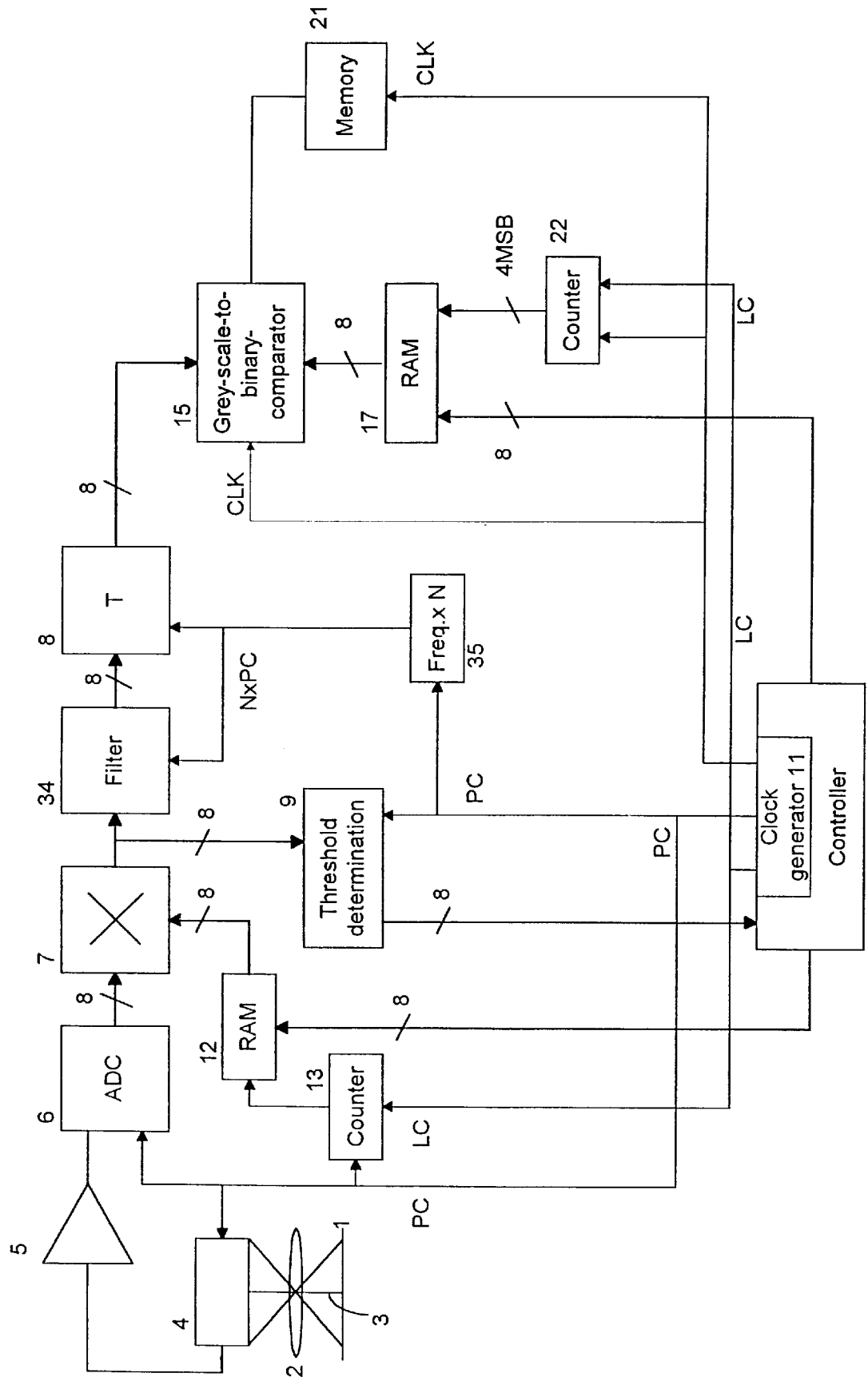
FIG. 8 shows a preferred embodiment at an apparatus for scanning a document and preparing the signal provided by the scanning for storage or reproduction, using zoned adaptive thresholding.

FIG. 8 shows a preferred embodiment of an apparatus for scanning a document and preparing the signal provided by the scanning for a reproduction, using zoned adaptive thresholding. FIG. 8 is different from FIG. 1 in that the threshold values from the threshold determination circuit 9 are not passed directly to the grey-scale-to-binarycomparator 15, but through the controller 10 and a storage circuit for storing threshold values for each respective zone. The controller 10 transfers the threshold values determined by the threshold determining circuit 9 to the RAM 17. The counter 22 is reset by a line clock signal LC from the clock generator unit 11 and is increased by one each time it receives a CLK clock pulse. The counter value represents the pixel number in a line, and the four most significant bits (4MSB corresponds to sixteen zones) are transferred to the RAM 17 for addressing the corresponding threshold value. The addressed threshold value is transferred to the first comparator input of gray-scale-to-binary-comparator 15.

The detailed description of the invention has so far been concerned with the adaptive threshold determination. However a special and feasible aspect of the invention is obtained if the weighted adaptive threshold determination is combined with a dithering process.

Figure 9:
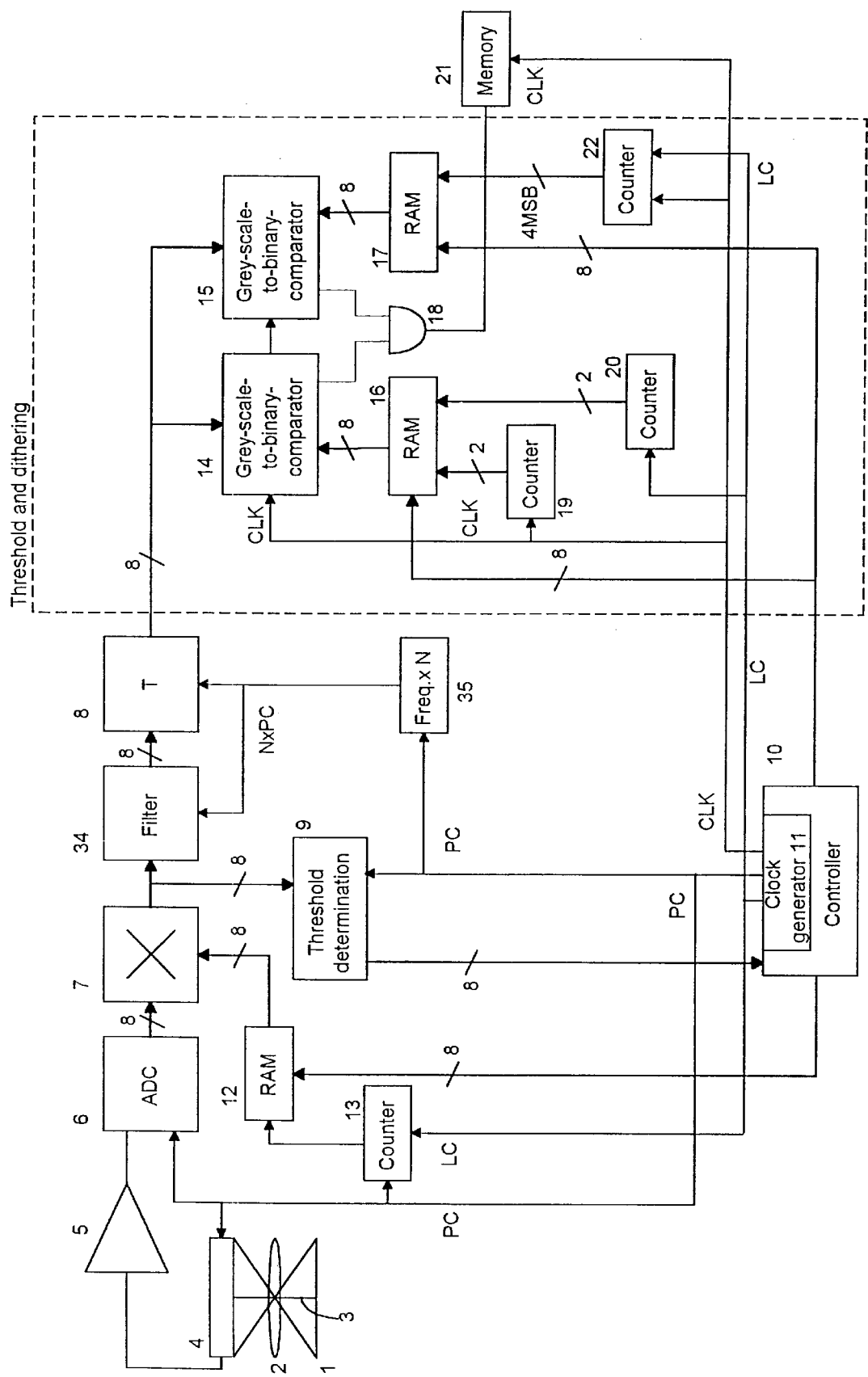
FIG. 9 shows a preferred embodiment of an apparatus for scanning a document and preparing the signal provided by the scanning for a reproduction by means of zoned thresholding and dithering.

FIG. 9 shows a preferred embodiment of an apparatus for scanning a document and preparing the signal provided by the scanning for a reproduction by means of zoned thresholding and dithering. The parts of FIG. 9 involved in the scanning and the threshold determination are similar to those shown in FIG. 8. Therefore only the dithering part of FIG. 9 will be considered in the following.

It is desired to reproduce the scanned document in a manner where "dark grey areas" become black ("0") and "white areas" become white ("1"), while grey areas in-between keep their overall grey appearance due to a pseudo random distribution of black and white pixels in the grey area corresponding to the original tones of grey on the scanned document. It is well known to obtain a grey area appearance in a 1-bit per pixel reproduction.

A technique useful for that purpose is called dithering, and this technique is e.g. described in "Digital Halftoning", by Robert Ulichney, The MIT Press, published 1987. It should be noted that the terms "dithering" and "dither circuits" are to be interpreted very broadly in the present: application, covering both the use of traditional dither matrices and error diffusion techniques. The purpose of the dithering is to convert a grey area on the scanned document into an area of a similar grey appearance obtained by an appropriate distribution of black and white spots on the reproduction. In general this is achieved by providing black spots on a white sheet.

It is well-known to a person skilled in the art to define the size of a dither matrix and the dither values or threshold values in the matrix. For the present purpose the dither matrices may be established in several ways. In one embodiment, the matrix may be determined universally for the scanner and never changed. According to the preferred embodiment the matrix is alterable by the controller during scanning and is varied in dependence on the statistical distribution of the adaptive threshold values known from the threshold determination.

In the embodiment shown in FIG. 9, the dither matrix comprises a 4×4 element, as shown in FIG. 11. The controller 10 transfers a single dither matrix to a RAM 16, and two 2-bit counters 19, 20 count the number of pulses in the resolution clock signal CLK and the line clock signal LC, respectively. The two 2-bit counters 19, 20 wrap around when overflow occurs. The counter value addresses (line, row) represent the element in the dither matrix corresponding to the pixel present on the input of the gray-scale-to-binary-comparator 14. In the grey-scale-to-binary-comparator 14, the grey tone value is compared with the addressed dither matrix element, and if the grey tone value exceeds the matrix element value the output of the comparator will be the binary value "1" (white), otherwise "0" (black).

The outputs from the two gray-scale-to-binary-comparators 14, 15 are received by a logical AND-gate 18, and if both the outputs from the two gray-scale-to-binary-comparators 14, 15 are the binary value "1", the AND-gate 18 will output the binary value "1" (white) as the 1-bit representation of the pixel, otherwise "0" (black). This value may be printed on e.g. a laser printer, viewed on a display device, or stored in a file. In this implementation the value is stored in the memory 21.

Figure 10:
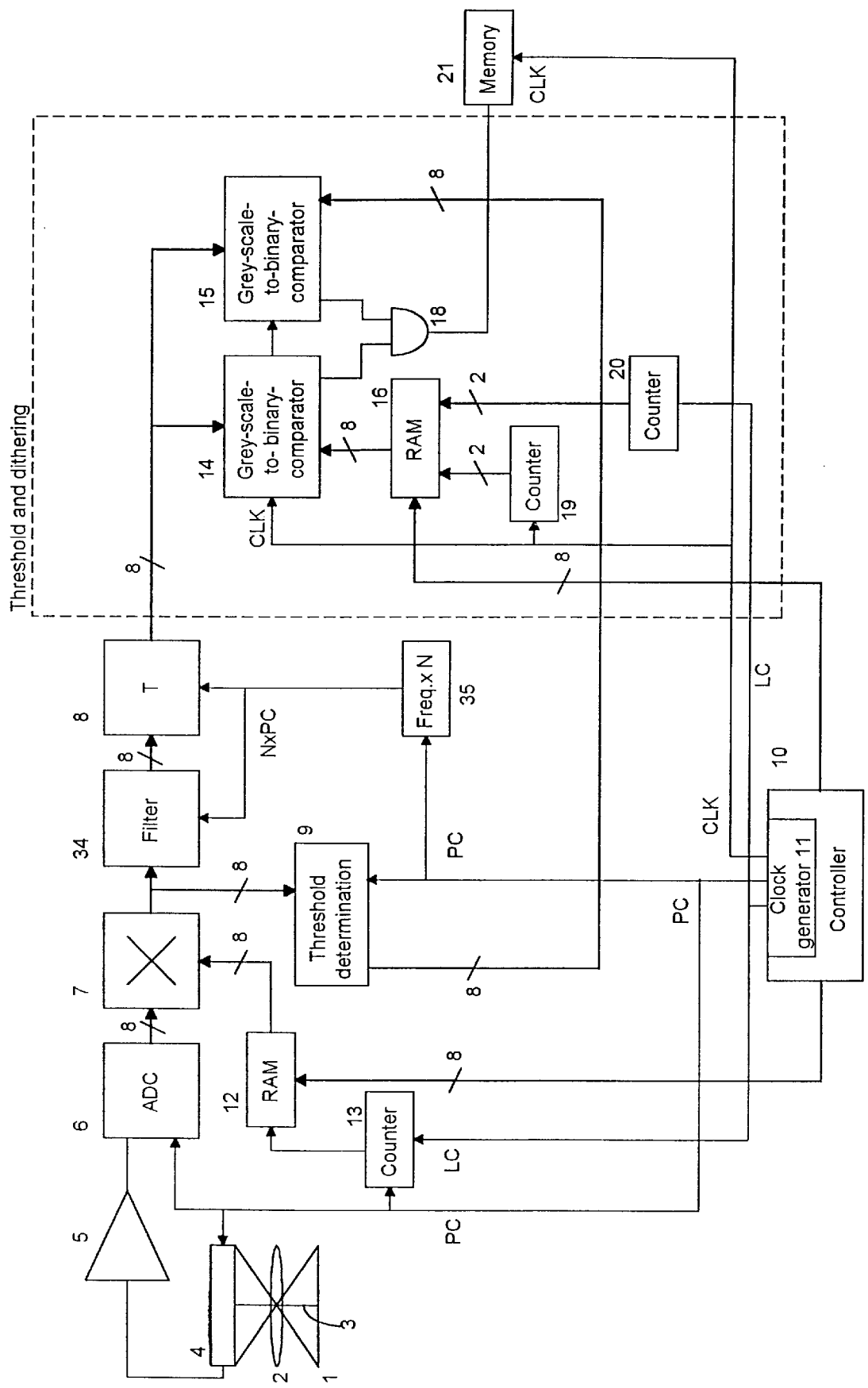
FIG. 10 shows a preferred embodiment of an apparatus for scanning a document and preparing the signal provided by the scanning for a reproduction by means of moving area thresholding and dithering.

FIG. 10 shows a preferred embodiment of an apparatus for scanning a document and preparing the signal provided by the scanning for a reproduction by means of moving area thresholding and dithering. The parts of FIG. 10 involved in the scanning and the dithering are similar to those shown in FIG. 9, but the zoned thresholding is omitted as known from FIG. 1. The threshold values from the threshold determination circuit 9 are passed directly to the first comparator input of the grey-scale-to-binary-comparator 15.

FIG. 12 illustrates the function of the apparatus shown in FIGS. 9 and 10. The digital 8-bit grey tone values from the delay 8 are mapped into a binary grey tone representation by means of a dither matrix. The dither matrix shown in FIG. 11 is stored in the dither RAM 16. When a grey tone value above the highest value (here 240) in the dither matrix is received on the input of the two grey-scale-to-binary-comparators 14, 15, the output from the dither comparator 14 will always be "1". This means that the output from the AND gate 18 will be a "1" if the grey tone value is above the threshold value in the threshold comparator 15. When a grey tone value is below the lowest value (here 80) in the dither matrix, the output from the dither comparator 14 will always be "0", and the output from the AND gate 18 will always be "0". When the grey tone value is in the range between 80 and 240, the output from the AND gate 18 will be "1", if the current grey tone value exceeds both the adaptive threshold value and the dither value, and "0" if the current grey tone value is lower than—or equal to—either the adaptive threshold value or the dither value.

When the scanned original is very dark, light areas may become white by increasing the slope of the line in a the coordinate system shown in FIG. 12. By using the function b, all grey tone values above 200 will be imaged into white pixels. This may be done by a relative reduction of the dither values in the dither matrix in FIG. 11a. The dither matrix shown in FIG. 11(b) corresponds to function b in FIG. 12. In the dither matrix the maximum value sets an upper limit above which all grey tone values are turned into white. The minimum value in the dither matrix sets a lower limit below which all grey tone values are turned into black.

Figure 13:
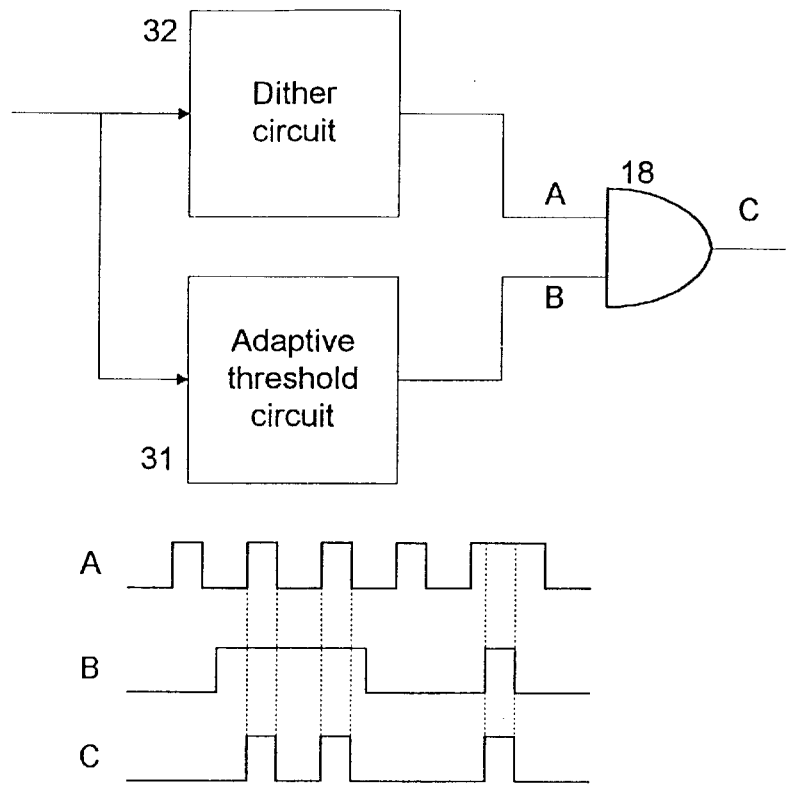
FIG. 13 schematically shows how the dither matrix may be corrected for the dark or light background.

The information about the foreground/background shades of the original is already present in the apparatus as adaptive threshold values from the adaptive threshold determination unit 31 (FIG. 13). Therefore this information may be transferred to the unit 32; that is via the controller 10 in FIG. 9 or 10 determining the algorithm for the dither matrix.

According to the invention, grey areas keep their overall grey appearance due to a dither distribution of black and white pixels in the grey areas corresponding to the original grey tone on the scanned document for grey foreground parts of the document, but are forced to black in the dark grey foreground parts of the document having grey tones below the adaptive threshold. According to a preferred embodiment of the invention, means are provided for preventing very light parts of the document from being forced to black when the adaptive threshold detects the foreground in these parts, maintaining the dither representation, as these very light parts often contain information that would otherwise be suppressed by the adaptive thresholding.

Figure 14:
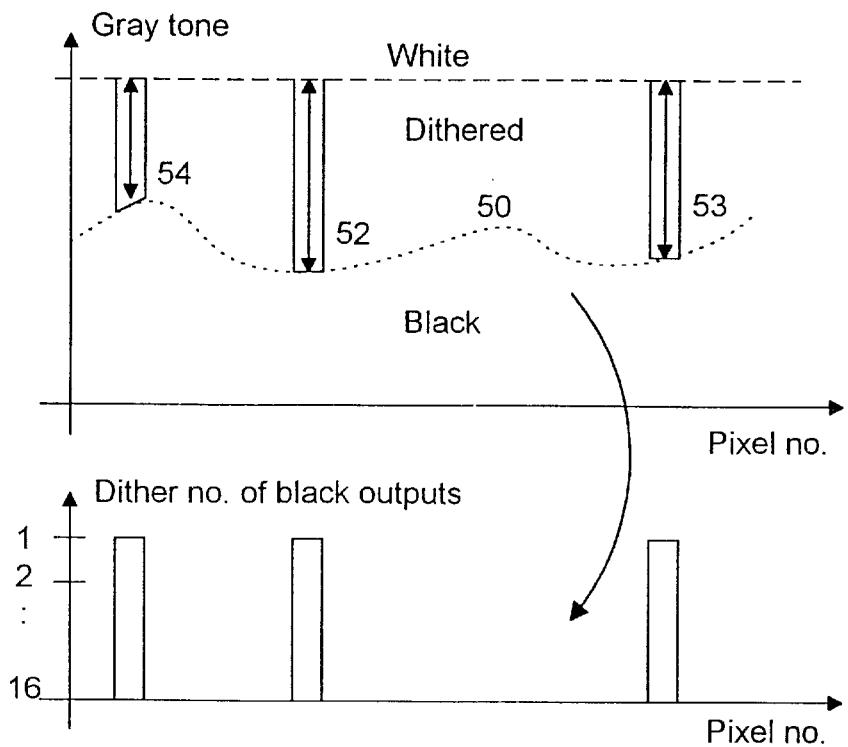
FIG. 14 shows how lines on a document with a 'weaving' foreground can be reproduced.

A preferred method of determining values in the dither matrix as a function of the adaptive threshold is to set the minimum value in the dither matrix equal to a collection of information on the actual adaptive threshold values, e.g. a running average. In order to maintain an optimal grey tone resolution, that is a resolution of 16 for a four times four dither matrix, the values in the dither matrix may be distributed between the minimum and maximum values so as to provide the optimal visual destination. With this approach, the effect of a weaving grey tone foreground is eliminated due to the fact that the adaptive threshold is a representation of the foreground, and that the dither matrix is adapted to this foreground representation. In a practical implementation it will be sufficient to select one out of a number of predefined dither matrices depending on the actual threshold value. FIG. 14 shows a scan line from a scanned document. Even though the foreground 50 is 'weaving', the three lines 52, 53, 54 printed on the document will be reproduced with almost the same binary grey tone representation (dither value).

The function illustrated in FIG. 14 is implemented by the controller 10 which receives the actual threshold values from threshold determination unit 9, and which performs the collection of statistical information and uses the gathered threshold statistics as an input to a transfer function determining the actual dithering matrix to be used. The controller 10 finally loads the matrix to the RAM 16. The dithering representation is hereby transformed so that the 'weaving' foreground is removed from the grey tone representation output from the dither circuit.

Figure 15:
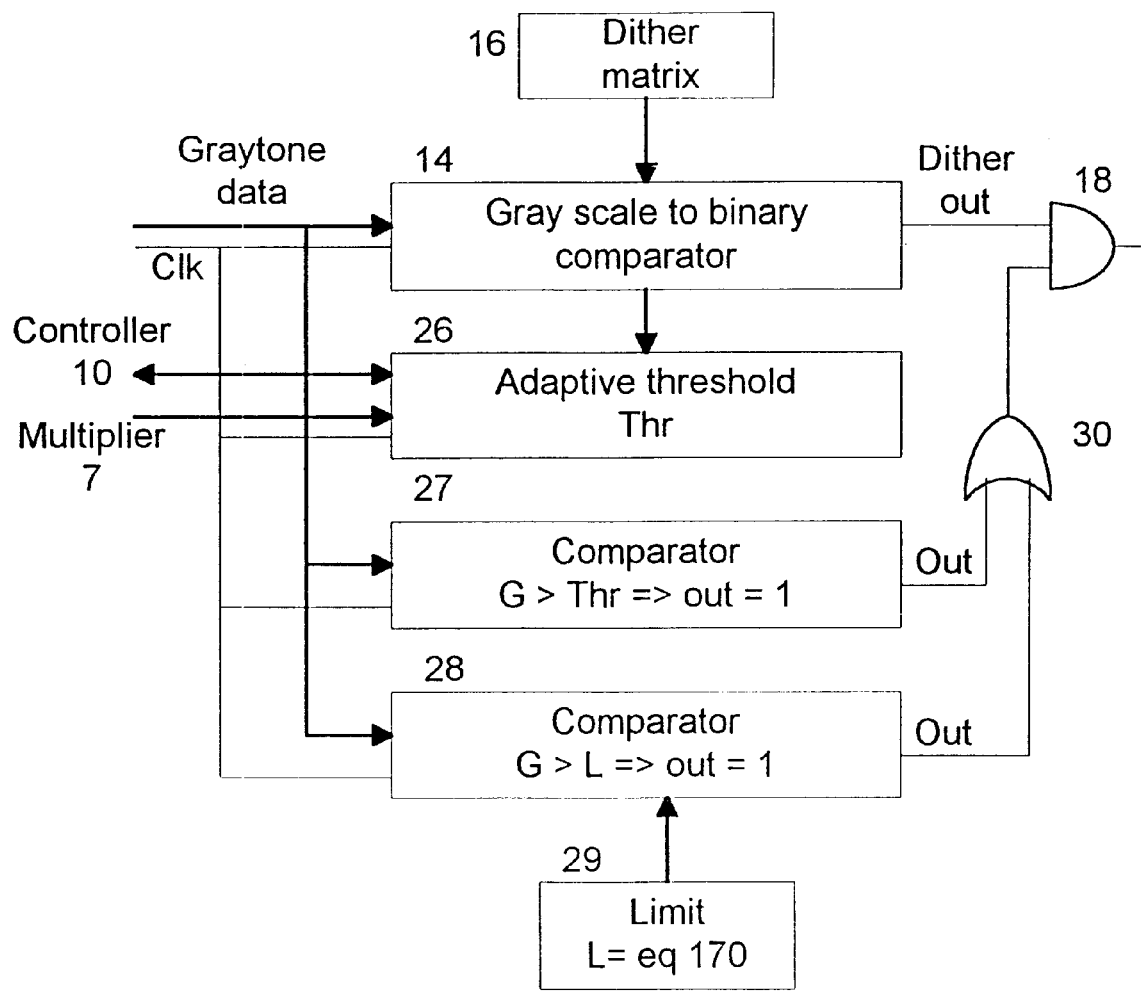
FIG. 15 shows an alternative embodiment of the configuration of the dither circuit and the threshold circuit.

An alternative embodiment of the configuration of the dither circuit and the threshold circuit is shown in FIG. 15. The signal comprising the scanned grey tone values is transferred from the delay 8 via a multi-bit bus (8 bit) to the gray-scale-to-binary-comparator 14 in which the grey tone values are compared with the dither values in the dither matrix. The values in the dither matrix are received from the RAM 16 including the values as discussed above.

The undelayed grey tone values from the multiplier 7 are transferred to a circuit 26 for determination of the adaptive threshold values in dependence on said transferred undelayed grey tone values from the original. This can be done as described above.

Two gray-scale-to-binary-comparators 27 and 28 receive the grey tone values (G) from the multi-bit bus. The first comparator compares the present grey tone value "G" with the adaptive threshold value (like the comparator 15 in FIG. 9), and gives the value "1" as the output if the grey tone "G" exceeds the threshold. The second comparator compares the present grey tone value "G" with a fixed limit value "L", and gives the value "1" as the output if the gray tone "G" exceeds this limit "L". The outputs from the two comparators 27 and 28 are fed to a logical OR gate 30 which gives the value "1" as the output if at least one of the outputs from the comparators has the value "1".

Compared with the embodiments shown in FIGS. 9 or 10, the threshold part 26–30 gives the output "1" when "G" exceeds the fixed limit value "L", e.g. 170. This means that the adaptive threshold is inactive above the limit "L", whereby an "almost" white area (typically in the grey tone range 170–240) will be dithered. Lines from e.g. soft crayons will hereby be visible.

Figure 16:
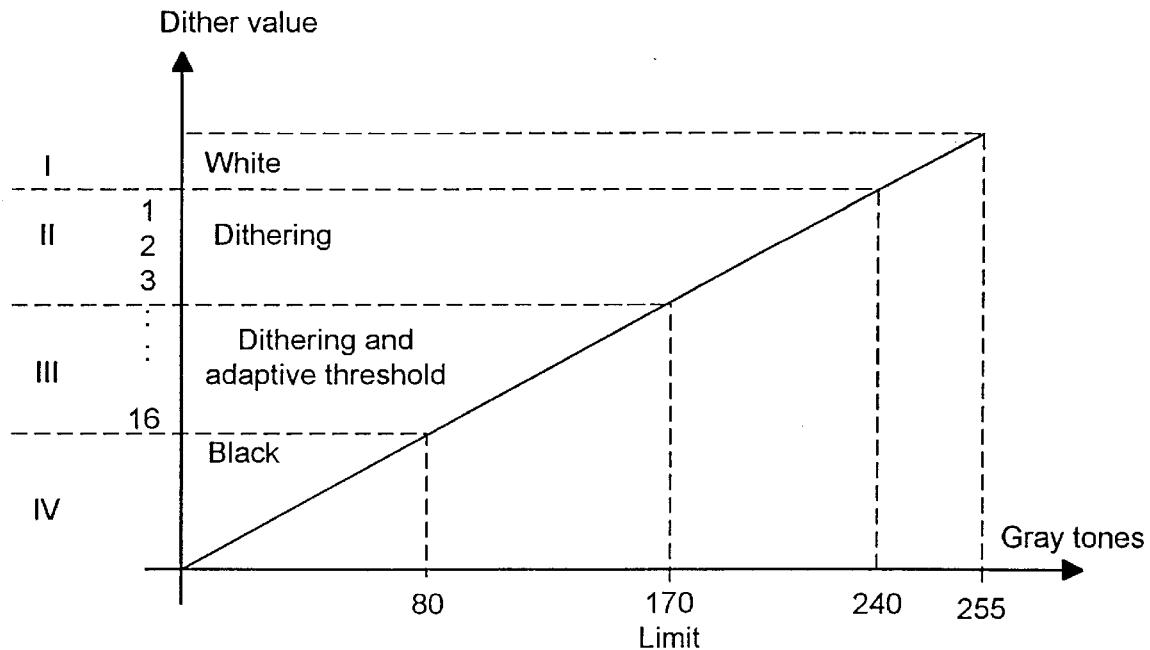
FIGS. 16 and 17 illustrate the multi-bit to 1-bit conversion in the unit shown in FIG. 13.
Figure 17:
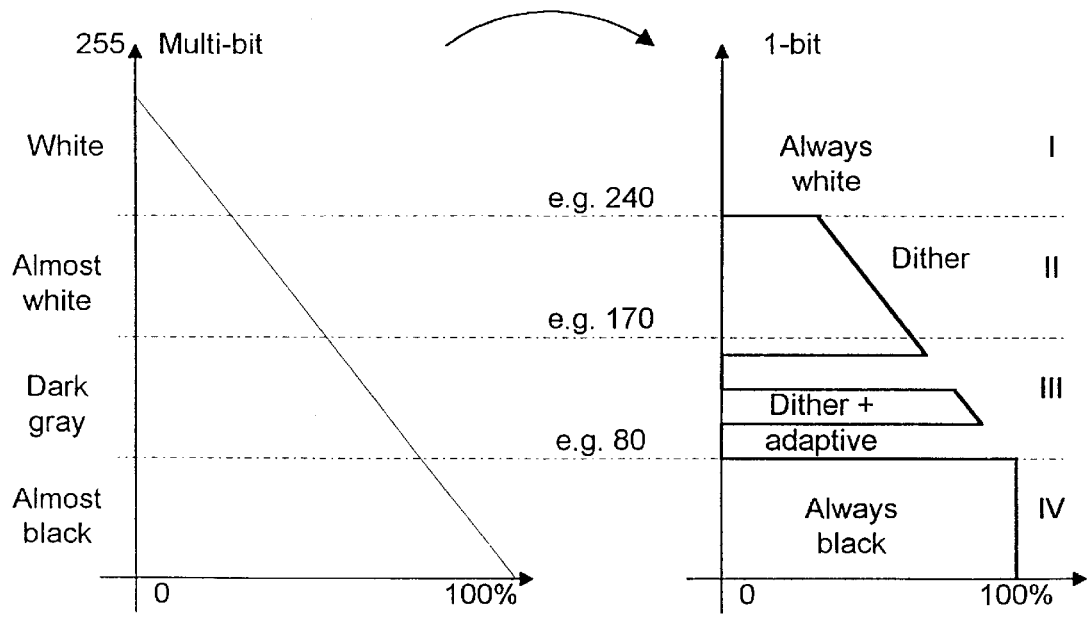

FIGS. 16 and 17 show two different ways of illustrating the multi-bit to 1-bit conversion in the unit disclosed with reference to FIG. 15. In FIG. 16 the grey tone values are depicted on the x axis in the range 0–255 (for an 8-bit signal). The y axis shows how the grey tone values are classified into four categories (I–IV) and indicates the transformation technique. The same is shown in FIG. 17 where the left triangle illustrates the multi-bit signal and the right triangle the 1-bit signal for reproduction.

With a dither matrix as shown in FIG. 11a, the transformation of the grey tone values generated by scanning into the 1 bit representation, as explained with reference to FIG. 15 will be discussed with reference to FIG. 16 and FIG. 17. As will be seen from FIG. 11a, all dither values (1–16) are located within a range (here 80 to 240).

The output from a "white area" with grey tone values in the range 240–255 will exceed the limit L, whereby the output from the comparator 28 and thereby the OR gate 30 will be "1"; also the output of the dither circuit 14 is always "1", causing the output of AND gate 18 to always be "1". The transformation of these "white pixels" will be placed in the range I in FIGS. 16 and 17.

The output from an "almost white area" with grey tone values in the range 170–240 will always be dithered in this embodiment. The grey tone values will exceed the limit L, whereby the output from the comparator 28 and thereby the OR gate 30 will be "1". This will allow the signal from the dither circuit 14 to just pass through the AND gate 18. The transformation of these "almost white pixels" will be placed in the range II in FIGS. 16 and 17.

In this embodiment the output from a "grey area" with grey tone values in the range 80–170 will be either dithered when the grey tone values exceed the adaptive threshold "Thr", or black when the grey tone values are lower than, or equal to, the adaptive threshold "Thr". When the grey tone values exceed the adaptive threshold, the output from the comparator 27 and thereby the OR gate 30 will be "1". This will allow the signal from the dither circuit 14 to just pass the AND gate 18. When the grey tone values are lower than, or equal to, the adaptive threshold, the output from the comparator 27 and thereby the OR gate 30 will be "0". Thereby the output from the AND gate will become a "0". The transformation of these "grey pixels" will be placed in the range III in FIGS. 16 and 17.

The output from an "black area" with grey tone values in the range 0–79 will always be black in this embodiment. The gray tone values will never exceed the lowest dither value, whereby the output from the AND gate 18 will always be "0". The transformation of these "almost black pixels" will be placed in the range IV in FIGS. 16 and 17.

Figure 18:
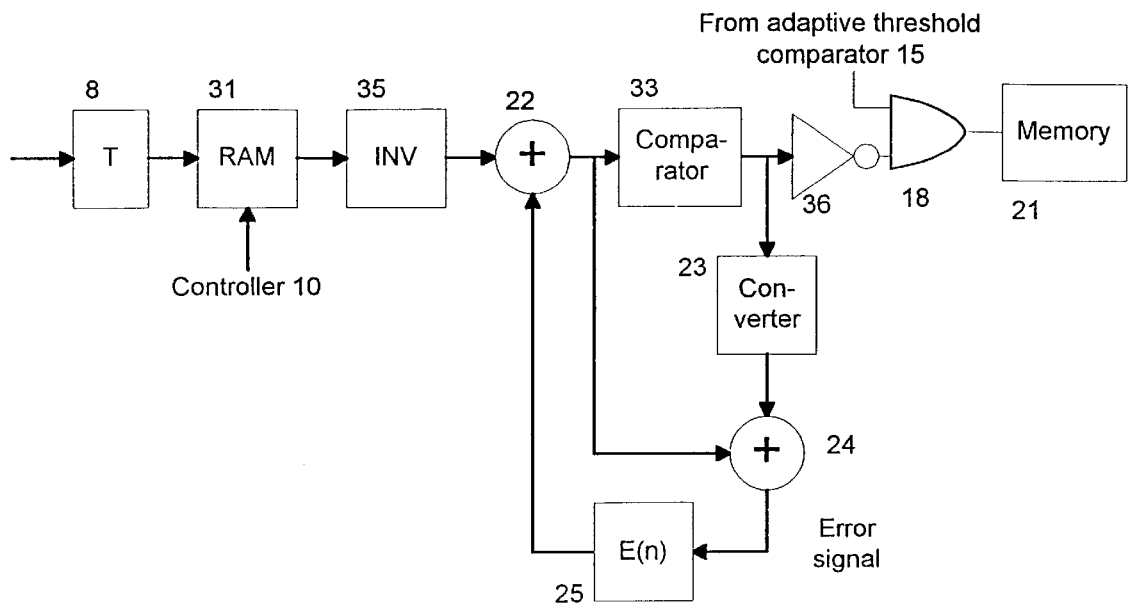
FIG. 18 shows an embodiment based on an error diffusion algorithm.

A further alternative embodiment of a dither circuit for a unit according to the invention is shown in FIG. 18. The dither circuit is based on an error diffusion algorithm. The dither circuit in FIG. 18 may replace the corresponding parts shown in FIG. 9, 10 and 15, said parts comprising the dither circuit 14,16,19,20 based on a dither matrix.

In the present embodiment the multi-bit signal comprises 8-bit values (values 0–255) and is passed from the delay 8 via a look-up RAM 31 to the multibit inverter 35 inverting 8-bit values in the range 0–255 to 8-bit values in the range 255–0. The output of multibit inverter 35 is passed to an adder 22. An error signal is added to the delayed signal in the adder 22. The compensated signal from the adder 22 is fed to a comparator 33 for conversion into a one-bit representation in dependence on the comparison of its grey tone value and a fixed threshold greater than or equal to the value of 255. The output from the comparator 33 is fed via the single bit inverter 36 to the memory 21 for storing before the reproduction or saving to disk storage.

The one-bit output signal from the comparator 33 is branched into a converter 23, in which the values "0" and "1" are converted into the values "0" and "255". This 8-bit signal with two valid values represents the pixels in the generated one-bit representation and is used for the compensation of the subsequent pixels. The compensated signal from the adder 22 is fed via a branch to a second adder 24. In this adder the signal from the converter 23 is subtracted from the compensated signal from the adder 22 for generating a representation for the error generated by the conversion in the comparator 33. This error representation is fed into an error filter unit 25 in which the errors are fractionated and stored for correcting subsequent pixels. The fractionated errors for the pixels are summed up before correction of the subsequent pixels. Errors in the conversion are hereby used to generate correction factors in a way so that the overall appearance of the original and the reproduction will be the same.

Figure 19:
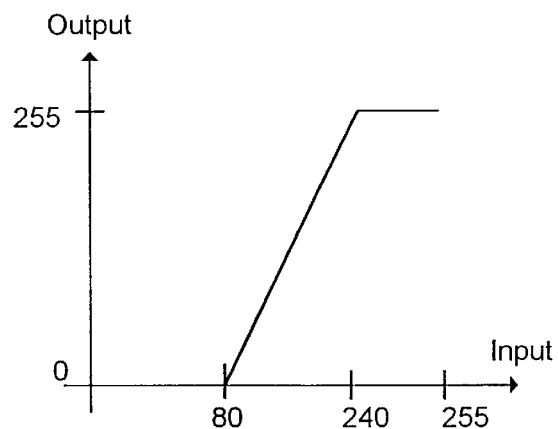
FIG. 19 shows an example of a transfer function stored in a look-up RAM according to a preferred embodiment of the invention.

An example of a transfer function stored in the lookup RAM 31 by the controller 10 is shown in FIG. 19. Similar to the function of the dither RAM 16 described above, the grey scale values exceeding a predetermined "highest value" (e.g. 240) are forced to be "white" (and will have the value 255). This will, via inverter 35, force the input to adder 22 to the 8-bit value 0, and as the 8-bit error signal from the error filter 25 comprising the other input to the adder 22 is normally less than the value 255 in a white area, the output value of adder 22 becomes less than the threshold of the comparator 33, forcing the output from the comparator 33 to be "0", which will again force the inverter 36 to output a "1" (white). Likewise, similar to the function of the dither RAM 16 described above, the grey scale values exceeding a predetermined "lowest value" (e.g. 80) are forced to be "black" (and will have the value 0). This will, via the inverter 35 force the input to the adder 22 to the 8-bit value 255, and together with the 8-bit error signal from the error filter 25 comprising the other input to the adder the 22, the output value of adder 22 exceeds the threshold of the comparator 33, forcing the output from the comparator 33 to be "1", which will again force the inverter 36 to output a "0" (black). The controller 10 may likewise control the slope of the transfer function between the limit values. When the transfer function is chosen so that input values in a given range are decreased, the reproduced output image from the error diffusion algorithm of that range will appear more dark, because the error diffusion algorithm will decrease the distance between 'black' output pixels. This fact makes it possible to compensate for foreground variations by adjusting the characteristics of the transfer function according to the adaptive threshold statistics. In a preferred method, the slope of the transfer function shown in FIG. 17 is increased by increasing the start value of the slope (e.g. from 80 to 100) when the adaptive thresholds increases and visa versa. In a practical implementation it will be sufficient to select one out of a number of predefined transfer functions.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive manner.

I claim:

1. An optical scanner having a weighted adaptive threshold value determination for generating a one-bit representation of a scanned original, comprising:

an optical detecting unit which provides a discrete signal representing pixels in a scanned region;

first means for generating a first weighted discrete signal, which is a weighted version of said discrete signal representing pixels in a scanned region;

second means for providing a filtered signal which is a filtered version of said weighted discrete signal;

third means for generating a second weighted signal, which is a weighted version of said filtered signal;

comparison means for producing a binary output as a function of said discrete signal representing pixels in a scanned region and said second weighted signal.

2. An optical scanner according to claim 1, wherein the signal representing pixels is generated as a digital multi-bit signal.

3. An optical scanner according to claim 1, wherein said comparison means takes said second weighted signal as threshold values for converting said discrete signal representing pixels into a binary output.

4. An optical scanner according to claim 3, wherein the discrete signal represents pixel values and wherein the discrete signal is delayed prior to the reception in said comparison means by means of a delay, said delay allowing said threshold values to be based on pixels both preceding and succeeding the pixels for which the adaptive threshold values are determined.

5. An optical scanner according to claim 1 further comprising means for providing variable resolution of the output compared with a resolution of scanning.

6. An optical scanner according to claim 1, wherein the descrete signal representing pixel values is interpolation filtered prior to the reception in the comparison means, said interpolation filtering allowing the variable resolution of the reproduction to be greater than the resolution of scanning.

7. An optical scanner according to claim 1, wherein said first means and third means implement two weighting functions which are inverse to each other.

8. An optical scanner according to claim 1, wherein said first means is proceeded by pre-emphasis means.

9. An optical scanner according to claim 8, wherein said first means and third means implement two weighting functions which are inverse to each other.

10. An optical scanner according to claim 1, wherein said first means includes pre-emphasis means.

11. An optical scanner according to claim 1, wherein said third means includes post-emphasis means.

12. An optical scanner according to claim 1, wherein said first means and third means implement two weighting functions which are respectively piecewise compounded.

13. An optical scanner according to claim 1, wherein said first means and third means implement two weighting functions which are based on inverse, square-root, log, or exponential mathematical functions.

14. An optical scanner according to claim 1, wherein said filtered signal is calculated as quasi-stationary values within a number of zones along the scanned lines.

15. An optical scanner according to claim 1, wherein said second means uses a two-dimensional digital filter.

16. An optical scanner according to claim 15, wherein said two-dimensional digital filter is an infinite impulse response, IIR, type.

17. An optical scanner according to claim 16, wherein said two-dimensional digital filter is a moving area average filter.

18. An optical scanner according to claim 17, wherein said two dimensional digital filter is divided into an along line and an across lines section.

19. An optical scanner according to claim 1, further comprising:

means for providing a one-bit representation in the form of values from a dither circuit;

means for converting the discrete signal into a signal comprising a one-bit representation, said conversion being responsive to the individual pixel values, the adaptive threshold values, and the dither values from the dither circuit.

20. An optical scanner according to claim 19, further comprising:

means for comparing the discrete signal with the adaptive threshold values for converting the individual pixel values into a one-bit representation;

means for passing the discrete signal through a dither circuit for converting the individual pixel values into a one-bit representation and selecting one of the one bit representations from the two comparisons as the one-bit representation output from the means for converting.

* * * * *

UNITED STATES PATENT AND TRADEMARK OFFICE
CERTIFICATE OF CORRECTION

PATENT NO. : 5,988,504
DATED : November 23, 1999
INVENTOR(S) : Asbjorn Smitt

It is certified that error appears in the above-identified patent and that said Letters Patent is hereby corrected as shown below:

On the Title Page

In column 1, item [22], please change "Jul. 15," to --Jul. 14,--.

In the Claims

In claim 6, line 2, please change "descrete" to --discrete--.

Signed and Sealed this

Third Day of April, 2001

Attest:

NICHOLAS P. GODICI

Attesting Officer     Acting Director of the United States Patent and Trademark Office